United States Patent [19]

Dony et al.

[11] Patent Number: 4,736,824
[45] Date of Patent: Apr. 12, 1988

[54] PNEUMATIC SPRING

[75] Inventors: Dominique Dony, Braillans; André Jaillet, Auxon-Dessus, both of France

[73] Assignee: Airax, France

[21] Appl. No.: 867,447

[22] Filed: May 28, 1986

[30] Foreign Application Priority Data

May 28, 1985 [FR] France ................. 85 07939

[51] Int. Cl.$^4$ .............................................. F16F 9/34
[52] U.S. Cl. ................... 188/322.17; 92/168; 277/28; 277/34
[58] Field of Search ............ 188/322.17, 322.22, 188/322.5, 297; 267/64.19, 64.23, 64.27; 92/168; 277/28, 34, 34.3, 34.6, 226

[56] References Cited

U.S. PATENT DOCUMENTS

| 3,104,916 | 9/1963 | Dowling et al. ........... 188/327.17 X |
| 4,342,336 | 8/1982 | Satterthwaite et al. ......... 277/34 X |
| 4,342,447 | 8/1982 | Marx .......................... 188/322.17 X |

FOREIGN PATENT DOCUMENTS 0117203  8/1984  European Pat. Off. ....... 188/322.17

Primary Examiner—Duane A. Reger
Attorney, Agent, or Firm—Staas & Halsey

[57] ABSTRACT

A spring-damping device operating with a pressurized gas in which sudden movements caused by a severe drop in pressure are avoided or limited. A variable volume chamber, which is usually in a state where it permits relative movement of a rod in relation to an enclosure, distorts during a rapid depressurization in the enclosure, until it opposes these movements, due to a valve which maintains its internal pressure near to the initial level.

20 Claims, 2 Drawing Sheets

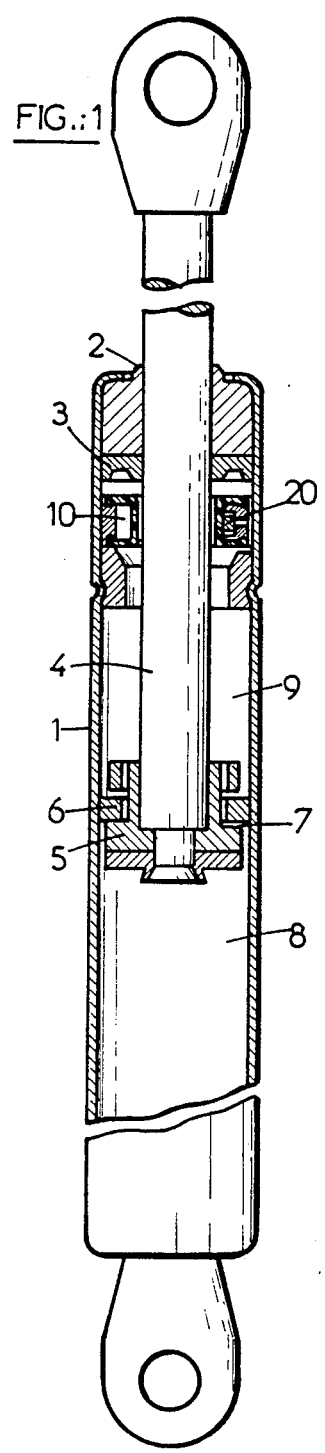
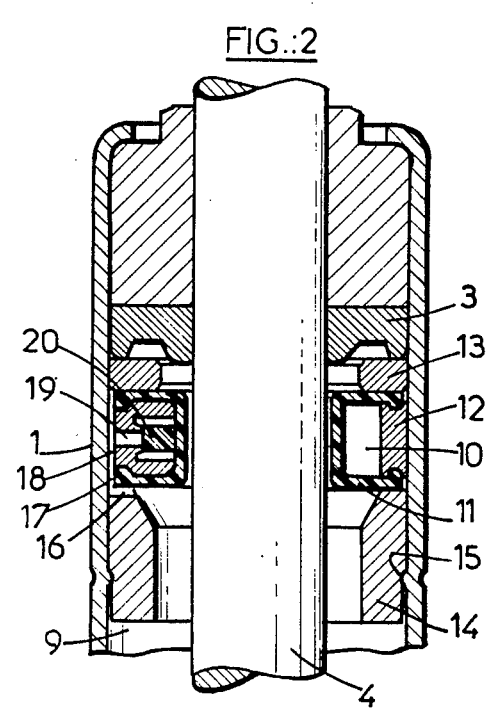
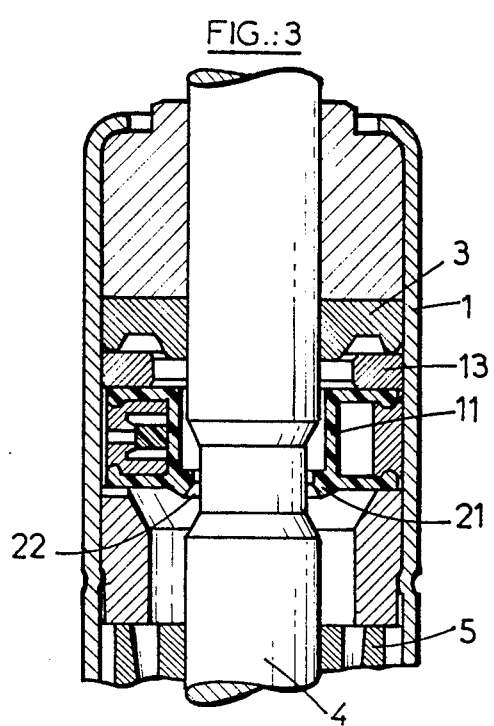

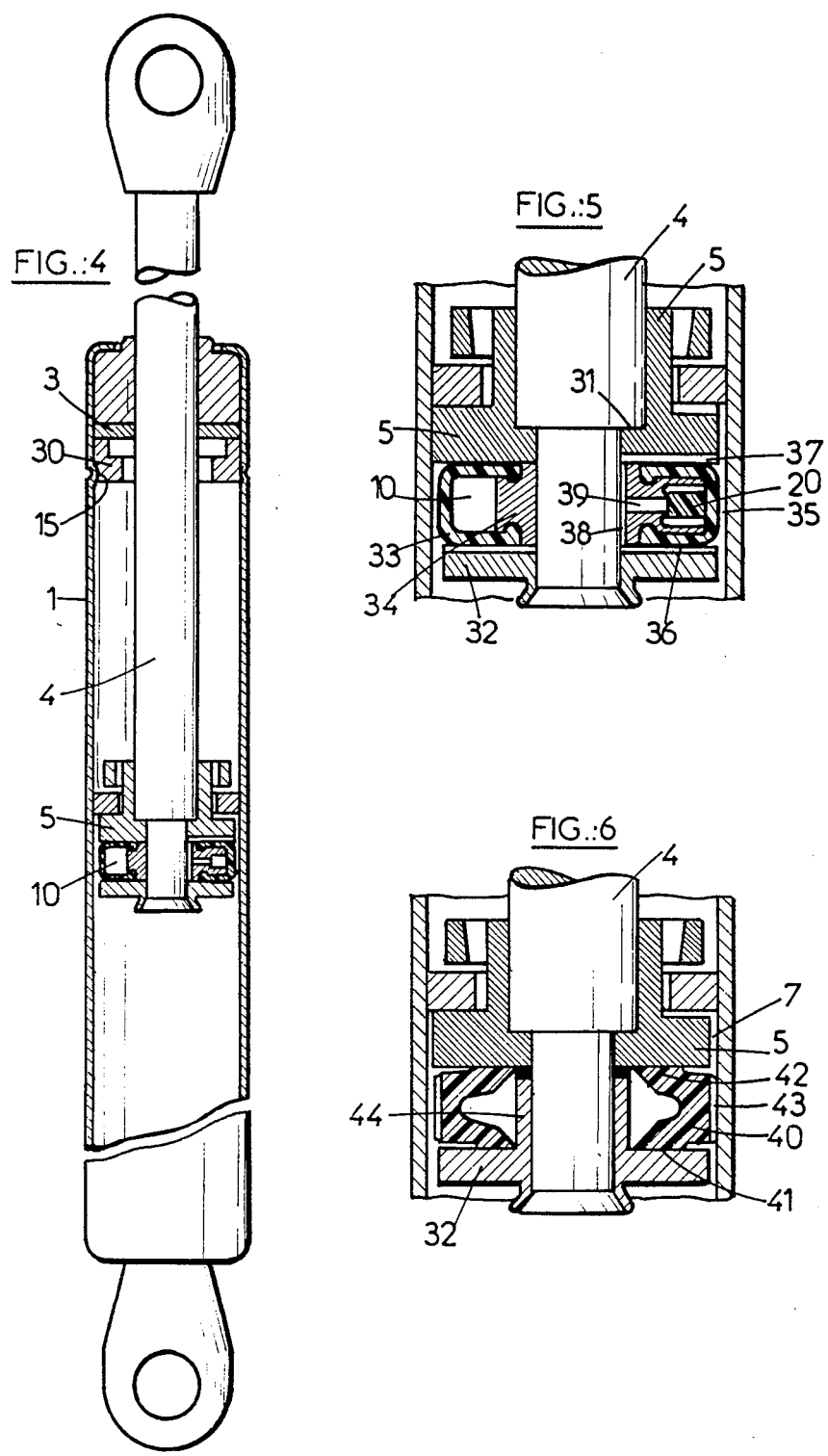

PNEUMATIC SPRING

BACKGROUND OF THE INVENTION

This invention relates to a pneumatic spring.

The principle of such springs has been known of for a long time: a cylindrical enclosure is divided into two chambers by a piston integral with a rod which projects from the enclosure through an impervious seal. The two chambers are joined together by a passage which includes a constriction. When the enclosure is filled with a gas under pressure, the rod is subjected to a force which causes it to come out of the enclosure, and which is proportional to the relative pressure in the enclosure and to the transverse section of the rod, and the movement of the rod is carried out at a speed which is governed by the flow of fluid through the constriction connecting the two chambers.

If the relative pressure of the fluid is zero, that is, if the fluid is at generally atmospheric pressure, then the device functions purely as a damping device.

If, on the other hand, the pressure of the fluid is high and if the constriction allows a substantial flow, then the device functions principally as a spring.

The higher the pressure in the enclosure, the more likely it is that damage resulting in a severe drop in pressure can have unfortunate consequences on an installation to which the spring-damping device is connected. In fact, due to the damage, the pressure drops rapidly in the chamber where the damage has been caused, while the action of the constriction only permits a slow drop in pressure in the other chamber. A phenomenon similar to the sudden, and undesired, slackening of a spring, with rapid and uncontrolled movement of the rod towards one of its extreme positions, is produced.

This can be seen particularly in the case of a device such as is described in French Pat. No. 1,336,987 relating to a "pneumatic spring" containing a gas at a pressure which can reach 150 bars.

Devices are already known in which the means for restraining the movement of a piston of a pneumatic spring are controlled by the pressure in a variable volume chamber. For example, French Pat. No. 2,444,854 describes a variable volume chamber which, when in its inactive state, is isolated from the enclosure of the pneumatic spring and contains a certain quantity of gas. When there is a fall in the pressure in the enclosure, a valve connects the variable volume chamber with the enclosure, which sets off the braking system. This system has the disadvantage, if it is sensitive, of being able to be set into action by a simple momentary difference in temperature between the chamber and the enclosure, without easily being returned to its previous state.

U.S. Pat. No. 2,928,507 provides for a braking action of the piston by the action of a variable volume chamber, but only in the case of over-pressure in the enclosure, which is contrary to the objective aimed at here. In this patent also, the enclosure is not connected to the chamber under normal operating conditions, which presents the same type of disadvantage as that described above.

The aim of the present invention is therefore to provide a device which is sensitive, that is, which reacts rapidly to a drop in pressure in the enclosure, which is not subject to being set in motion at inopportune moments and which, furthermore, is simple, strong and economical.

SUMMARY OF THE INVENTION

To achieve this result, this invention provides a gas spring-damping device, comprising a narrow enclosure intended to contain a pressurised gas. This enclosure is cylindrical and divided into two chambers by a moveable piston integral with a rod which protrudes from the enclosure by passing through; a gas-tight seal; a constricted passage permanently connecting the two chambers and a variable volume chamber which can pass from an inactive state, wherein it does not oppose relative movement between the rod and the enclosure, to an active state, wherein it opposes said movement. The variable volume chamber is in an inactive state when its internal pressure is approximately equal to that of one chamber of the enclosure, and in an active state when its internal pressure is higher, by a predetermined amount, than that in the same chamber of the enclosure. A valve is arranged to keep the variable volume chamber in communication with the chamber of the enclosure when the pressure in the chamber of the enclosure is approximately equal to or higher than the pressure in the variable volume chamber, and to break the communication between the two chambers during a severe drop in pressure in the chamber of the enclosure.

The variable volume chamber can be composed of metallic sections which can move in relation to each other. However, to achieve a greater simplicity of construction and a more advantageous cost, it is preferable for it to be composed of an inflatable ring, at least one wall of which is of a resilient, impervious material. This ring is coaxial with the enclosure.

The variable volume chamber can, in its active state, provide a restraint to the relative movement between the rod and the enclosure, this restraint being either permanent or overcome by appropriate means or force. It is, however, more advantageous to provide that, in its active state, the variable volume chamber opposes the relative movement between the enclosure and rod, by providing friction which can be overcome by a force greater by a predetermined amount than the normal force for setting the spring-damping device into action. In fact, immobilization can then be achieved in any position of the rod, without discontinuity, and subsequent displacement is made easier.

If this embodiment is combined with the preceding one, the resilient material forming part of the walls of the variable volume chamber, for example an elastomer, can also constitute the frictional material.

Advantageously, the walls of the variable volume chamber may comprise an annular U-shaped section, made of a flexible and impervious material, and a rigid tubular section connecting the two flanges of the U-section, this tubular section being traversed by the passage connecting the variable volume chamber with the chamber of the enclosure, the tubular section furthermore bearing the valve, the latter being activated by the distortion of the tubular section caused by a positive difference in pressure between the interior of the variable volume chamber and the opposite race of this section.

It will be observed that, in this case, the valve is not activated by a flow of fluid from the variable volume chamber to the chamber of the enclosure, but directly by the difference in pressure between the two sides of the wall of the variable volume chamber, from which is achieved greater security and speed of action.

Two different embodiments are preferred. Although they are not absolutely identical, they do give very similar results.

In the first one, the variable volume chamber is inside the enclosure, is integral with it and, when it is in an active state, exerts a frictional force on the rod.

In the second embodiment, the variable volume chamber is inside the enclosure, is integral with the rod and, when it is in an active state, exerts a frictional force on the inner wall of the enclosure.

The first embodiment makes it possible to achieve a total compactness with the gas-tight seal through which the rod projects from the enclosure. Furthermore, the space which exists between the rod and the variable volume chamber in its inactive state can be used as a lubricant reservoir.

The second embodiment permits a more efficient frictional force, since it acts on a surface of greater diameter. Furthermore, if it is provided that the passage connecting the variable volume chamber to a chamber of the enclosure emerges in the passage permanently connecting the two chambers, this passage going through or skirting around the piston, the greatest reaction speed can be obtained, on whichever side of the gas spring the damage has taken place.

According to another variation which is simpler and more economical no matter which embodiment is chosen, it can be provided that the variable volume chamber is composed of a U-section ring with thin flanges, which is capable of sliding radially in a groove with sides perpendicular to the axis, the flanges forming, with the sides of the groove, the valve.

BRIEF DESCRIPTION OF THE DRAWINGS

FIG. 1 is a front partial cross-sectional view of the spring of the present invention according to a first embodiment, FIG. 2 is an enlarged cross-sectional view of part of FIG. 1, FIG. 3 is a similar view to FIG. 2, showing a variation, FIG. 4 is a partial cross-sectional view of the spring of the present invention according to a second embodiment, FIG. 5 is an enlarged cross-sectional view of part of FIG. 4, and FIG. 6 is a similar view to FIG. 5, showing a variation.

DETAILED DESCRIPTION OF THE PREFERRED EMBODIMENTS

The spring-damping device shown in FIG. 1 is of a type which has gas compressed at high pressure. It comprises a metallic cylindrical enclosure 1, closed at one end and having at the other end an opening 2 fitted with an impervious seal 3 through which a rod 4 is slideable. A piston 5 fitted with a sealing washer 6 is fixed at an end of this rod. A passage 7 with a small cross-section connects the two opposite surfaces of the washer 6, and consequently connects the two chambers 8, 9 in the interior space of the enclosure 1.

Adjacent the seal 3, an annular variable volume chamber 10 is defined by a synthetic elastomer rubber annular section 11, which is a U-section open in the radial direction facing away from the axis, and a metallic tubular section 12, the ends of which closely support the flanges of the U-section, and the external diameter of which is approximately equal to the internal diameter of the enclosure 1.

The variable volume chamber 10 is held in position, in the axial direction, between a first annular blocking section 13, the opposite face of which bears against the impervious seal 3, and a second annular blocking section 14 which is held in place by an internal rib 15 on the wall of the enclosure 1. The two blocking sections 13, 14 have the same external diameter as the tubular section 12, and therefore bear against the inside of the enclosure 1. It should be noted that, in devices of the prior art type, the seal 3 is held in the same way by a blocking section held in place by an internal rib.

FIGS. 1 and 2 show the variable volume chamber 10 in its inactive state.

It can be seen from the these figures that the internal diameter of the rubber annular section 11 is slightly greater than the diameter of the rod 4, so that it does not hinder the sliding of the rod 4 at all.

A passage connects the interior of the variable volume chamber 10 with that of the chamber 9 of the enclosure, which contains the rod 4. This passage is composed of a radial groove 16 formed in the surface of the second blocking section 14 which is in contact with the variable volume chamber 10, a narrow annular cavity 17 which exists between the rubber section 11 and the wall of the enclosure 1, an axial groove 18 on the external surface of the tubular section 12, and a radial channel 19 which passes through this tubular section 12 and emerges on one side in the axial groove 18 and on the other side inside the variable volume chamber 10.

The tubular section 12 has a valve 20, coaxial with the radial channel 19. This well-known valve, 20 is made of elastomer. It is lightly compressed between the seating which it seals and the internal surface of the rubber section 11, when the latter is in its inactive state.

The spring operates is as follows. When the pistons is immobile, or when it moves at low speed, controlled in particular by the speed at which the gas passes through the passage 7 of the piston 5, the variations in pressure in the chamber 9 are zero or slow, and the difference in pressure between the chambers 9 and 10 is slight. Supposing that some damage causing a severe drop in pressure takes place in the chamber 9, for example at the level of the seal 3, and the difference in pressure causes the valve 20 to remain seated. The pressure inside of the variable volume chamber 10 is thus kept at an approximately constant value, while the pressure in the chamber 9, and consequently in the space between the rod 4 and the section 11, continues to drop rapidly. This results in the internal surface of the section 11 bearing on the rod 4 and exerting on it a frictional force which is proportional to the pressure which prevails in the chamber 10, until this rod 4 is brought to rest.

If the damage takes place on the opposite side of the spring-damping device, the severe drop in pressure in the chamber 8 causes rapid movement of the piston 5, and, consequently, the pressure also drops severely in the chamber 9, with the result that the same conditions are obtained as above.

FIG. 3 shows a variation of the device of FIG. 2. The annular section 11 has, on the side which is opposite to the seal 3, a flexible flange 21 directed towards the axis which bears against the rod 4 even when in its inactive state. The space contained between the section 11, the blocking section 13, the seal 3 and the rod 4 forms a lubricant reservoir. Operation is the same as above, the only difference being that, when the chamber 10 distorts as it passes into its active state, the lubricant is partially expelled towards the chamber 10 due to the flexibility of the flange 21.

In order to refill the lubricant reservoir, a groove 22 next to the piston 5 can be provided on the rod 4, the depth of this groove 22 being sufficient to allow a passage between the bottom of it and the flange 21. An imperfect braking system is of course obtained as long as the chamber 10 is on the right of the groove, but this is not serious since the piston 5 is then just about at the end of its travel.

FIGS. 4 to 6 show a spring-damping device according to a second embodiment of the invention. The same reference numerals are used for the same components as in the previous figures.

The main difference is in the fact that the variable volume chamber 10, instead of being fixed on the enclosure 1 to act on the rod 4, is carried by the piston 5 to act on the wall of the enclosure 1.

The seal 3 is held by a single blocking section 30 which is held in place by an internal rib 15, as has been mentioned above with regard to the prior art.

The piston 5 is held in the axial direction on one side by a shoulder 31 on the rod 4, and on the other side by a disc 32 which is set at one end of the rod 4, as in the prior art, but, instead of the piston 5 being directly supported on this disc 32, the variable volume chamber 10 is inset between these two sections. This variable volume chamber 10 is composed of an annular U-shaped rubber section 33, facing this time in the direction of the axis of the rod 4, and a tubular section 34 encircling the rod 4 and supported on the two flanges of the U-section.

In its inactive state, the section 33 leaves a space 35 between itself and the wall of the enclosure 1. This space forms part of the passage 7 which connects the two chambers 8 and 9 of the enclosure. The chamber 10 is connected to the space 35 by a passage with two branches, which comprise: a radial groove 36 formed in the disc 32 on the side opposite the chamber 10, and a radial groove 37 formed in the piston 5, also on the side opposite the chamber 10, an axial groove 38, formed on the inner surface of the tubular section 34 and which connects the two grooves 37 and 36, and a radial channel 39 which passes across the tubular section 34 and emerges on one side towards the middle of the axial groove 38 and on the other side in the variable volume chamber 10. A valve 20, supported by the tubular section 34, is arranged to close the channel 39 in the manner described above.

Operation of this embodiment is completely similar to that described above, and will not therefore be described in further detail.

However, it should be noted that, when the chamber 10 moves into its active state, the continuity of the passage 7 is unbroken, as the gas can pass from chamber 8 to chamber 9 and vice versa through the grooves 36, 38 and 37. Thus the piston can be moved by a suitable force without the difference in pressure between the chambers 8 and 9 bringing it back to its initial position.

FIG. 6 shows a variation of the device in FIG. 5. The left-hand side of this figure shows the chamber 10 in its inactive state, and the right-hand side of the same figure shows the same chamber 10 in its active state. In this figure, the annular section 40 is not fixed, but can slide along the radially open surfaces of the piston 5 and the disc 32; it is provided with the flexible flanges 41, 42, which serve both as gliding surfacs and as valves allowing the gas to pass from the passage 7 to the interior of the chamber 10, but not in the opposite direction.

The continuity of the passage 7 is ensured by the axial grooves 43 provided on the external surface of the annular section 40. The disc 32 is extended by a tubular part 44 which extends along the rod and which does not form the equivalent of the tubular section 34 (FIG. 4), but merely serves to immobilize the piston. Therefore the tubular part 44, with the surfaces positioned radially from the disc and the piston, forms a rectangular sectioned groove in which the section 40 slides.

It should be noted that the arrangement described with reference to FIGS. 1 to 3 can be modified according to what has been said with regard to FIG. 6, as one with ordinary skill in this art will understand without any difficulty.

It should also be noted that the fluid contained in the chamber 10 can be different from that in the enclosure. In this case, a moveable separating piston or a flexible membrane can be provided, for example, in the radial channel 19 or 39 in FIGS. 2 and 4.

We claim:
1. A gas spring-damping device comprising:
   (a) a narrow cylindrical enclosure containing a pressurized gas;
   (b) a moveable piston which divides the enclosure into first and second chambers and is integral with a rod which protrudes from the enclosure by passing through a gas-tight seal;
   (c) a constricted passage permanently connecting the first and second chambers;
   (d) a variable volume chamber which can pass from an inactive state, wherein it does not oppose relative movement between the rod and the enclosure, to an active state, wherein it opposes said movement; the variable volume chamber being in an inactive state when its internal pressure is approximately equal to that of one of the first and second chambers of the enclosure, and in an active state when its internal pressure is higher, by a predetermined amount, than that in said one of the chambers of the enclosure; and
   (e) a valve arranged to keep the variable volume chamber in communication with said one of the chambers of the enclosure when the pressure in said one of the chambers of the enclosure is approximately equal to or higher than the pressure in the variable volume chamber, and to break the communication between said one of the chambers and the variable volume chamber during a severe drop in pressure in said one of the chambers of the enclosure.

2. A spring-damping device according to claim 1, wherein the variable volume chamber comprises an inflatable ring, at least one wall of which is of an impervious, resilient material, the ring being coaxial with the enclosure.

3. A spring-damping device according to claim 1, wherein, in its active state, the variable volume chamber opposes relative movement between the enclosure and the rod, by providing friction which can be overcome by a force greater by a predetermined amount than the normal force for operating the spring-damping device.

4. A spring-damping device according to claim 1, wherein the walls of the variable volume chamber comprise an annular U-shaped section, made of an impervious flexible material, and a rigid tubular section connecting the two flanges of the U-section, the tubular section being traversed by the passage connecting the variable volume chamber with said one of the chambers of the enclosure, the tubular section furthermore supporting the valve, which is set in action by a positive difference in pressure between the interior of the variable volume chamber and the first and second chamber of the enclosure.

5. A spring-damping device according to claim 1, wherein the fluid of the enclosure is a gas.

6. A spring-damping device according to claim 1, wherein the variable volume chamber is inside the enclosure, is integral with the latter and, when it is in its active state, exerts a frictional force on the rod.

7. A spring-damping device according to claim 6, wherein a space between the variable volume chamber and the rod, when in the inactive state, forms a lubricant reservoir.

8. A spring-damping device according to claim 1, wherein the variable volume chabmer is inside the enclosure, is integral with the rod and, when it is in its active state, exerts a frictional force on the internal wall of the enclosure.

9. A spring-damping device according to claim 8, wherein the passage which connects the variable volume chamber to said one of the chambers in the enclosure emerges in the passage permanently connecting the first and second chambers, this passage traversing the piston.

10. A spring-damping device according to claim 1, wherein the variable volume chamber includes a U-section ring, having thin flanges, capable of sliding radially in a groove with sides perpendicular to the axis, the flanges forming, together with the sides of the groove, the valve.

11. A spring-damping device according to claim 1, wherein the variable volume chamber contains a fluid different from that in the enclosure.

12. A gas spring-damping device, comprising:
(a) a narrow cylindrical enclosure containing a pressurized gas;
(b) a movable piston which divides the enclosure into first and second chambers and is integral with a rod which protrudes from the enclosure by passing through a gas-tight seal;
(c) a constricted passage permanently connecting the first and second chambers;
(d) a variable volume chamber including an annular U-shaped section of an impervious flexible material forming walls and a rigid tubular section for connecting the two legs of the U-shaped section, wherein the tubular section is traversed by the passage connecting the variable volume chamber with said one of the chamber of the enclosure, wherein in an inactive state, the variable volume chambers does not oppose relative movement between the rod and the enclosure, and in an active state, the variable volume chamber opposes said movement, the variable volume chamber being in an inactive when its internal pressure is approximately equal to that of one of the first and second chambers of the enclosure, and in an active state when its internal pressure is higher, by a predetermined amount, than the pressure in said one of the chambers of the enclosure; and
(e) a valve arranged to keep the variable volume chamber in communcation with said one of the chambers of the enclosure when the pressure in said one of the chambers of the enclosure is approximately equal to or higher than the pressure in the variable volume chamber, and to break the communication between said one of the chambers and the variable volume chamber during a severe drop in pressure in said one of the chambers of the enclosure.

13. A spring-damping device according to claim 12, wherein the variable volume chamber comprises an inflatable ring, at least one wall of which is of an impervious, resilient material, the ring being coaxial with the enclosure.

14. A spring-damping device according to claim 12, wherein, in its active state, the variable volume chamber opposes relative movement between the enclosure and the rod, by providing friction which can be overcome by a force greater by a predetermined amount than the normal force for operating the spring-damping device.

15. A spring-damping device according to claim 12, wherein the variable volume chamber is inside the enclosure, is integral with the enclosure and, wherein during the active state the variable volume chamber exerts a frictional force on the rod.

16. A spring-damping device according to claim 15, wherein a space formed between the variable chamber and the rod during the inactive state forms a lubricant reservoir.

17. A spring-damping device according to claim 12, wherein the variable volume chamber is inside the enclosure, is integral with the rod and, during the active state, exerts a frictional force on the internal wall of the enclosure.

18. A spring-damping device according to claim 17, wherein the passage which connects the variable volume chamber to said one of the chambers in the enclosure emerges in the passage permanently connecting the first and second chambers, the passage traversing the piston.

19. A spring-damping device according to claim 12, wherein the variable volume chamber includes a U-section ring, having thin flanges, capable of sliding radially in a groove with sides perpendicular to the axis, the flanges forming, together with the sides of the groove, the valve.

20. A spring-damping device according to claim 12, wherein the variable volume chamber contains a fluid different from that in the enclosure.

* * * * *